Oct. 14, 1952 L. BRÉGUET ET AL 2,613,750
SPEED AND ACCELERATION ACTUATED
POWER PLANT CONTROL MEANS
Filed Feb. 10, 1948 3 Sheets-Sheet 1
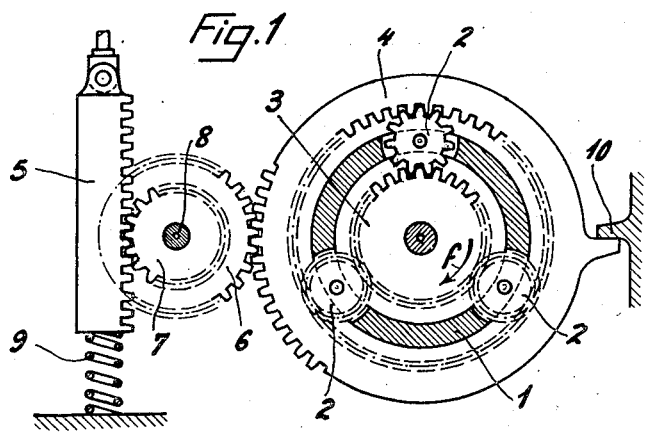
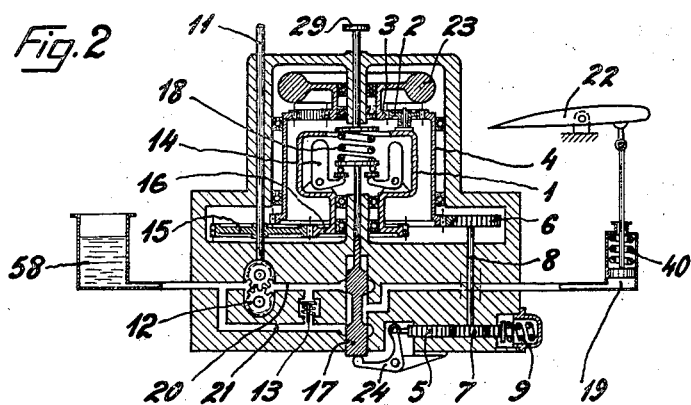

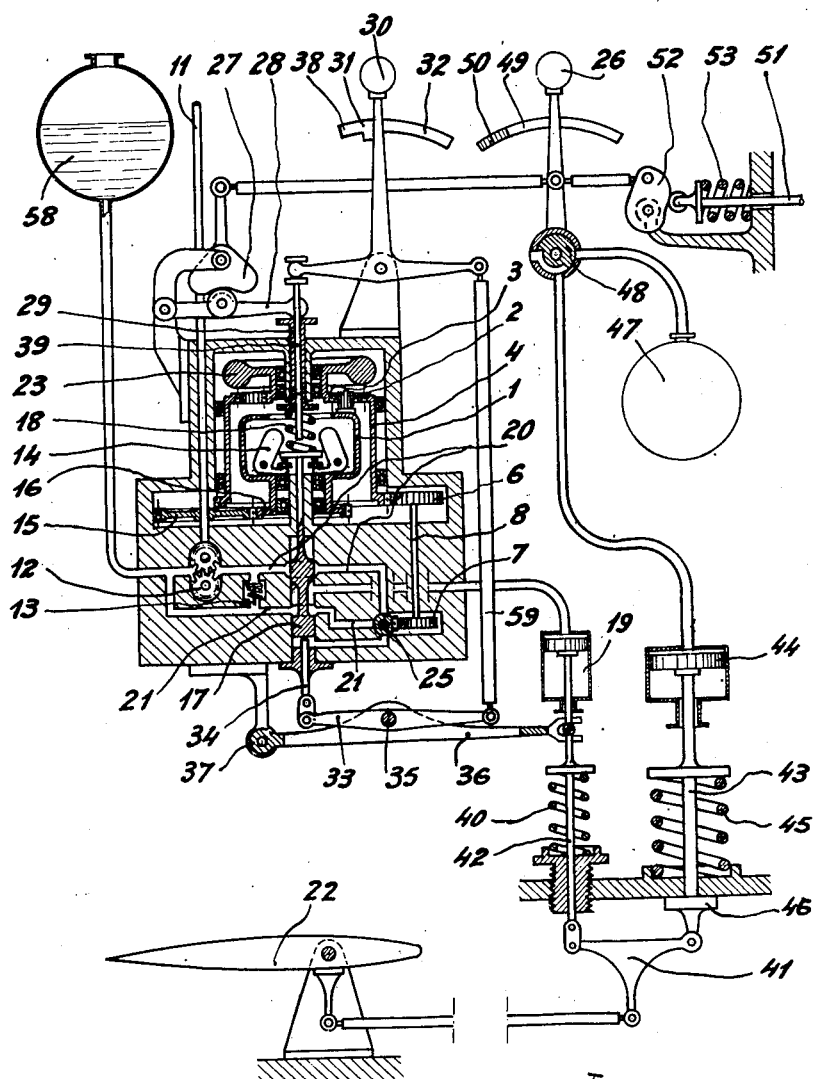

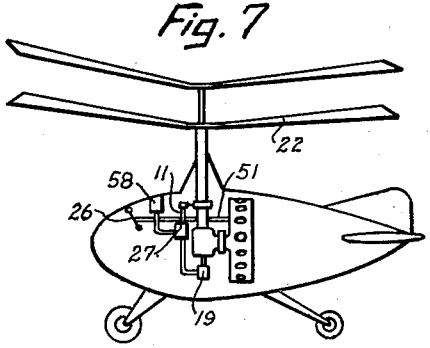
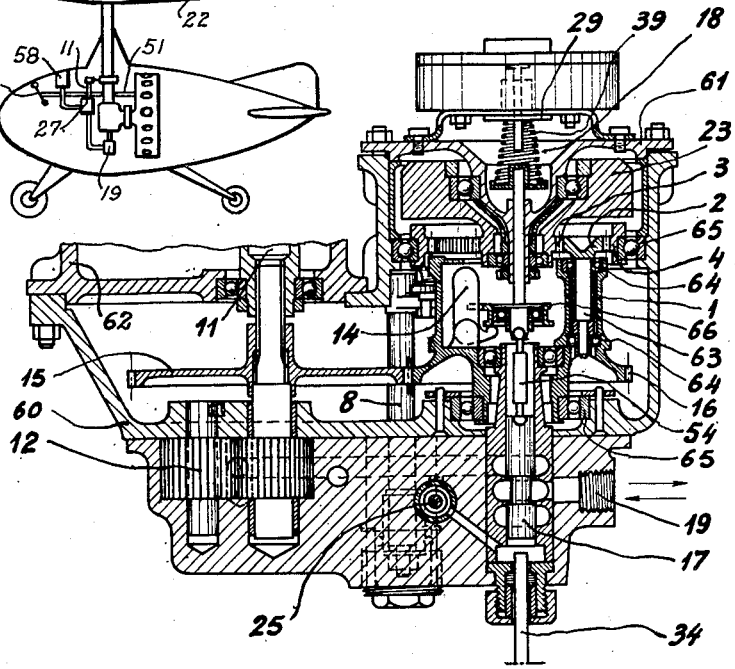
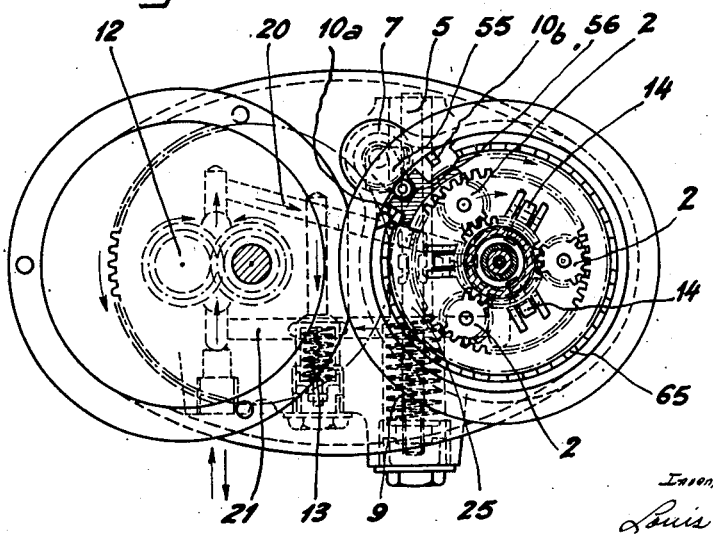

Patented Oct. 14, 1952

2,613,750

UNITED STATES PATENT OFFICE 2,613,750

SPEED AND ACCELERATION ACTUATED POWER PLANT CONTROL MEANS

Louis Breguet and René Devillers, Paris, France; said Devillers assignor to said Breguet Application February 10, 1948, Serial No. 7,356
In France February 18, 1947

11 Claims. (Cl. 170—135.74)

The present invention relates to power plant control means adapted to counteract casual or accidental changes in rate of a rotary power absorbing apparatus.

An object of the invention is to provide control means particularly adapted for and operatively connected to helicopter rotor blades, to control the pitch thereof.

An object of the inveintion is to provide improved control means comprising a device responsive to the R. P. M. of the power absorbing apparatus and a device responsive to the acceleration thereof, said devices being arranged to act selectively or simultaneously as the case may be. In particular, the acceleration responsive device is adapted to act on the pitch with the utmost rapidity in order to prevent undue increase in R. P. M.

A feature of the invention is to use a centrifugal governor as speed responsive device and a fly-wheel arrangement as acceleration responsive device, both of said devices being adapted to actuate valve means controlling a hydraulically-operated servo-motor associated with the power absorbing apparatus. The fly-wheel as well as the governor are driven from the power absorbing apparatus, through a gearing such that the fly-wheel is rotated at a higher speed than the governor, a sun-and-planet gear being associated with said fly-wheel and said governor, on the one hand, and with the valve means on the other hand, whereby any lag occurring between the fly-wheel and the governor is transmitted to the valve means which is driven accordingly.

A further object of the invention is to arrange the fly-wheel and the governor devices so that the former will act on the valve means when sudden acceleration occurs, while the latter will act for gradual accelerations.

According to a feature of the invention, the control means causes the pitch to increase as soon as acceleration of the rotor occurs, but remains idle in the case of retardation.

According to a further feature of the invention, manual control means are provided for adjusting the pitch and the R. P. M. of a helicopter rotor, said manual control means acting in association with the above-specified automatic control means.

According to a still further feature, the manual control means are only capable of increasing the pitch during normal flight, the manually controlled decrease of the pitch being a purely occasional and special maneuver.

Other objects and advantages of the invention will be apparent during the course of the following description.

In the accompanying drawing forming a part of this invention and in which like numerals are employed to designate like parts throughout the same.

Fig. 1 shows diagrammatically a gear train including a sun-and-planet gear,

Fig. 2 is a diagrammatic axial section of a regulator according to the invention, Fig. 3 is a similar section of a further form of regulator, Fig. 4 is a diagrammatic section showing the association of a regulator with its control means and actuated members, Fig. 5 is a section through the axis of a regulator showing, on an enlarged section, the assembly of the various component members, Fig. 6 is a plan view corresponding to Fig. 5, and Fig. 7 is a diagrammatic view of a helicopter provided with the control means of the invention.

The gear train of Fig. 1 comprises a rotary member 1 hereinafter called "casing," carrying planet-gears 2 mounted for free rotation relatively thereto, which mesh on the one hand with an inner coaxial pinion or sun gear 3, and on the other hand with an outer coaxial ring gear which is integral with a drum 4. The latter is geared to a rack 5 through a transmission consisting of a pinion 6, in mesh with outer teeth of the drum 4, a further pinion 7, in mesh with the rack 5, and a common shaft 8 to which both pinions 6 and 7 are wedged. The rack 5 is urged, by means of a return spring 9, into a position corresponding to the abutment of the drum 4 against a stationary stop 10.

The inner pinion 3 is integral (see Fig. 2) with a fly-wheel 23, whereas the rotary casing 1 which bears at its top part the planet-gears 2, is integral with a pinion 16 meshing with a toothed wheel 15 wedged to a rotary shaft 11 driven from a power absorbing apparatus, the rate of which is to be adjusted. This aparatus is diagrammatically illustrated as a rotary blade 22. The shaft 11 further drives a rotary pump 12.

This pump 12 sucks up oil from a tank 58 and discharges it into a duct 20, at a pressure which is limited owing to the provision of a relief valve 13 inserted on a by-pass or exhaust duct 21. The supply duct 20 is controlled by a slide-valve 17 whose rod extends into the casing 1. This rod is urged upwards by a pair of governor flyballs 14, and downwards by a governor speeder spring 18 which bears at one end on the slide-rod and at the opposite end on a movable piston abutment 29 arranged through a central opening, at the top of the casing 1.

The rack 5 is hingedly connected to one end of an angle-lever 24 whose other end is in contact with the end face of the slide valve 17, so that the latter is urged upwards when the rack 5 moves towards the right, but remains unaffected when the rack moves towards the left.

The slide-valve 17 controls the supply of pressure liquid to a servo-motor, illustrated as a hydraulic ram 19 provided with a return spring 40, and controlling the load of the power absorbing apparatus, that is, in this case, the pitch of the rotor blades, generally indicated at 22.

The power control embodiment described with reference to Figs. 1 and 2, operates as follows:

The power absorbing apparatus drives, through the shaft 11 and the gearing 15—16, the casing 1 which thus rotates at a speed corresponding to the R. P. M. of the rotor, and in the direction of the arrow f. The planet-gears 2 are thus driven along the teeth of the ring gear 4 which remains stationary owing to the stop 10. This motion of the planet-gears causes the inner pinion 3 to rotate, at a relatively high speed, in the direction of the arrow f, thus driving the high-inertia fly-wheel 23. The shaft 11 simultaneously drives the pump 12 which builds up pressure.

The position of the valve 17 in Fig. 2 corresponds to normal cruising rate. Indeed, as shown, the valve obturates the passage to and from the ram 19, and the pitch of the blades 22 remains constant. A lift of the valve 17 would correspond to an increase in pitch, while a drop of the valve would correspond to a decrease in pitch. The stationary obturating position of the valve corresponds to equilibrium between the opposing forces exerted by the centrifugal governor 14 and by the speeder spring 18.

The rate of the blade-carrying rotor can be casually altered in two ways: viz. a sudden acceleration or a gradual one.

If the rotor suddenly starts accelerating, the casing 1 will accelerate in its turn. However, the inner pinion 3 will be unaffected owing to the inertia of the fly-wheel 23, integral therewith. Thus a lag will occur between the casing 1 and the pinion 3, and the planet-gears 2 will give rise to a reaction torque urging the ring gear 4 in the direction of the arrow f. This angular displacement of the ring gear 4 is converted, through the gearing 6—7, into translational displacement of the rack 5 against the action of the spring 9, i. e. towards the right of Fig. 2. The angle-lever 24 is swung accordingly and the slide-valve 17 is urged upwards, thus opening the supply duct 20. As a result, the pitch of the blades 22 is automatically increased when the rotor starts accelerating, thus hindering this tendency. This automatic action takes place with the utmost rapidity.

As the pitch of the blades increases, the rotor tends to slow down, and accordingly the opposite phenomenon occurs in the sun-and-planet gears, i. e. the lag between the casing 1 and the fly-wheel pinion 3 is inverted, and as a result the ring gear 4 is returned to the position illustrated in Fig. 1. This movement, owing to the gearing 6—8—5 and to the action of the spring 9, causes the lever 24 to swing back, and the slide-valve 17 is now free to move down. However, it is to be noted that the lever 24 does not "pull" the slide-valve which will return to obturating position, as urged by the speeder spring 18, the action of the governor 14 having remained substantially constant owing to the very slight variation in R. P. M.

When, on the other hand, the R. P. M. of the rotor slowly and gradually increases, thus giving the fly-wheel 23 time to catch up, the regulating action is exerted by the governor. Indeed, as the casing 1 rotates at a quicker rate, the fly-balls 14 swing outwardly owing to increasing centrifugal force, thus driving the slide-valve 17 upwards. As before, the ram 19 is fed with pressure liquid and the pitch of the blades 22 increases.

As a consequence, the R. P. M. of the rotor slows down and the flyballs 14 start swinging inwardly; the slide-valve 17, urged by the governor speeder spring 18, obturates the supply duct 20.

If the R. P. M. goes on decreasing, the flyballs swing further towards their innermost position, and the slide-valve 17 moves further down, thus connecting the ram 19 to the exhaust duct 21; the pressure is released and the pitch of the blades decreases, owing to the action of the spring 40.

The embodiment illustrated in Fig. 3 is similar to that of Fig. 2, except as regards the actuation of the slide-valve 17 by means of the rack 5. In this case, the angle-lever 24 has been replaced by an auxiliary hydraulic system including a further slide-valve 25 which constitutes an extension of the rack 5. The slide-valve 17 has a piston shape and is free to move in a cylindrical enclosure.

In the position illustrated, the slide-valve 17 is in obturating position. If a sudden acceleration occurs, as before the rack 5 is displaced towards the right, carrying in its motion the auxiliary slide-valve 25 against the action of the spring 9. The outlet duct 21 is first obturated and then the supply duct 20 is uncovered. Pressure is exerted on the base surface of the slide-valve 17 which behaves as a piston; the latter moves upwards, thus allowing supply of pressure liquid to the ram 19 and increase in pitch. Inversely, when the rotor starts slowing down, the auxiliary slide-valve 25 which is driven towards the left, first obturates the pressure duct 20 and then uncovers the outlet duct 21. Hence pressure on the bottom of the slide-valve 17 is released and the latter moves down to obturating position.

The operation occurring during slow and gradual changes in R. P. M. is similar to that described above, i. e. the slide-valve 17 is driven according to the opposing actions of the flyballs 14 and of the speeder spring 18.

In this case, the pressure provided by the pump 12 can be such as to always move the piston valve 17 when the slide-valve 25 is moved (i. e. in case of an acceleration) even if the R. P. M. of the power absorbing apparatus is low, that is to say even if the flyballs lean on their abutments under the pressure exerted by spring 18.

In the general diagram of Fig. 4, the adjustable piston abutment 29 is shown to be controlled by a lever 28 actuated, through a heart-shaped cam 27 and an appropriate linkage, by means of a hand lever 26. The latter moves opposite a sector 49 which is provided with an end portion 50 so designed that the lever 26 can only be moved opposite it willingly for special reasons specified hereafter; under normal conditions of flight, the lever 26 is set at the position illustrated, or it is moved towards the right. This hand lever 26 is further linked to the rod 51 of the engine throttle valve, through a conveniently shaped cam 52 pushing this rod against the action of a return spring 53. Moreover, the hand lever 26 controls a three-way cock 48 inserted into the connection between a source of compressed air 47 and a pneumatic servo-motor illustrated as a ram 44. In the position shown, the cock 48 connects the ram 44 to the atmosphere. However, when displaced towards the end 50, the hand lever 26 causes the cock first to cut off the outlet to the atmosphere, and then to connect the ram 44 to the source of pneumatic pressure 47.

The ram 44 acts, through a rod 43 and oppositely to a spring 45, on one end of a toggle-lever 41, a stop 46 limiting the uppermost position of the rod 43.

This toggle-lever 41 is further hinged, at its opposite end, to a rod 42 fast with the piston of the hydraulic ram 19, and at an intermediate point, to the pitch control rod of the blade 22.

The rod 42 of the hydraulic ram 19 is associated with a lever 36 adapted to oscillate about a stationary point 37 and hinged, at an intermediate point 35 thereof, to a toggle-lever 33. The latter is linked, at one end thereof, to a pusher member 34 cooperating with the slide-valve 17, and, at the opposite end thereof, to a rod 59 associated with a T-shaped hand lever 30. The latter also actuates a further pusher member 39 slidably fitted through the piston abutment 29 and its control lever 28.

In the illustrated position, the hand lever 30 abuts against a stop 31 provided on a sector 32 and which limits its adjustment under normal flight conditions. However, this hand lever 30 is capable of moving beyond the stop 31 to the end 38 of the sector 32, if conveniently and willingly maneuvered for special reasons specified hereafter.

The arrangement of Fig. 4 which is particularly adapted for helicopters, operates as follows:

In the form illustrated in Fig. 4, the lever 26 is shown in a position such that the engine (not shown on said figure) is supplied with fuel just sufficiently for sustaining the aircraft in the air for normal flight; the recessed portion of the cam 27 acts on the lever 28, so that the spring 18 is under minimum stress. The centrifugal governor is adjusted for a low R. P. M. of the rotor and adjusts the pitch for maintaining this low R. P. M.

When the hand lever is moved towards the right, more fuel is supplied to the engine owing to linkage 51, 52 and both the rotor and the engine accelerate. Simultaneously, the right-hand bulge of the cam 27 depresses the lever 28, thus increasing the stress of the governor speeder spring 18. Hence, the governor is adjusted for a higher R. P. M. of the rotor; this allows acceleration of the rotor and the engine. In other words, the increasingly stressed spring 18 hinders the action of the flyballs 14 on the slide-valve 17, tending to increase the pitch, as this would prevent the rotor from accelerating. Nevertheless the centrifugal governor operates as described above and adjusts the pitch for maintaining the R. P. M. at a value corresponding to the stress of spring.

When the hand lever is moved towards the left, the power of the engine becomes insufficient for sustaining the craft and the latter starts descending. Simultaneously, the left-hand bulge of the cam 27 depresses the lever 28 thus stressing the spring 18. The flyballs 14 are centripetally moved by the spring and the slide-valve 17 is urged downwards as shown in the figure, so that the ram 19 is exhausted and the blades 22 are adjusted to the minimum pitch (auto-rotation pitch) which is thus achieved merely by action on the hand lever 26.

Now, the engine can be disconnected from the rotor owing to operation of a clutch, and the rotor rotates freely (motorless downward flight). The autogyration R. P. M. may be greater than the lowest R. P. M. of the engine-driven rotor. Nevertheless, the centrifugal governor cannot increase the pitch in case of autogyration, because the stressing of the spring 18 corresponds to an R. P. M. of the rotor greater than the autogyration R. P. M.

However, in all cases, an acceleration of the rotor always causes an increase in pitch, because when the sliding valve 25 is displaced, the full liquid pressure acts on the bottom of the piston valve 17 and moves it, even if the spring 18 is stressed and if the flyballs 14 lean on their abutment.

Thus, when landing tail-down, after a downward oblique motorless flight, during the ultimate nose lift, the rotor accelerates. The pitch therefore increases automatically without delay as soon as the maneuver is initiated. It is thus possible to avoid the simultaneous delicate control of the pitch and of the nose lift.

Furthermore the control of the spring 18 may be independent of the throttle-lever 26, and obtained with another lever. These two levers can be arranged adjacent to one another so as to be grasped simultaneously. This disconnection is necessary in particular when the centrifugal governor remains operative during autogyration, in which case the R. P. M. of autogyration may be adjusted in accordance with the altitude.

The positioning of the lever 26 on the end portion 50 corresponds to a special maneuver whose object is to bring about firm application of the aircraft on the ground. Indeed, the properly shaped cam 52 causes again the throttle to open and more fuel to be supplied to the engine. But the cock 28 is now in the position wherein the source of compressed air 47 is connected to the pneumatic ram 44, and the pitch of the blades 22 is inverted, i. e. the "lift" of the rotor is now directed downwards.

As stated above, the relative arrangement of the lever 26 and of the sector 49 is such that the former cannot be casually set opposite the end portion 50. This positioning must be the result of a willing action of the pilot. For normal control purposes, during flight, the pilot will merely set the lever 26 between the position illustrated in Fig. 4 and the right-hand end position. Consequently, the actuation of lever 26 will result in an acceleration of the rotor (owing to increased output of the engine) without corresponding increase in pitch (owing to the locking action of the compressed speeder spring 18).

The other hand lever 30 has for its object to allow adjustment at will of the pitch of the blades, without substantially affecting the R. P. M. of the rotor, as determined by the speeder spring 18. Indeed, when this lever 30 is displaced towards the right, the linkage 59—33 causes the pusher member 34 to rise and urge the slide-valve 17 upwards. Pressure liquid then flows into the hydraulic ram 19, and the toggle-lever 41 swings, thus causing the pitch of the blades 22 to increase.

However, as the rod 42 moves down, the lever 36 which is accordingly displaced angularly, carries along the toggle-lever 33. As a result, the pusher 34 recedes, and the slide-valve 17 returns, as urged by the spring 18, to obturating position. The pusher 34 will then behave as an abutment preventing downward motion of the slide-valve 17, i. e. decrease in pitch.

If the lever 30 is displaced further right, the pusher 34 will again drive the slide-valve 17 until a new and greater pitch is achieved. On the contrary, if the lever 30 is displaced leftwards, the pusher will merely recede further, without dragging along the slide-valve 17 since it can only "push," the position of this slide-valve being now, as before, determined by the opposing actions of the governor flyballs 14 and the speeder spring 18. In particular, if the R. P. M. decreases, the valve 17 will connect the ram 19 to exhaust at 21 and the pitch will decrease. However, this decrease will be limited to a value corresponding to the position of the lever 30, since, as the rod 42 moves up, so will the pusher 34, and the slide-valve 17 will be returned to obturating position.

In other words, the positioning of the lever 30 results in a predetermined minimum pitch, i. e. for a given setting of the lever 30, the pitch will be equal to or greater than a given value, but never smaller than this value.

It is thus possible to obtain accurately, whatever be the initial state of the governor device, a variation in pitch, depending on the displacement of the control lever 30, each position of which corresponds to a minimum pitch. As the pilot cannot directly decrease the pitch, provided he does not willingly actuate the lever 26, accidental over-speeding of the rotor is avoided.

It will be assumed obviously that the valve 17 cannot urge back the pusher 34 and the control lever 30.

This "locking" of the pitch against any variation towards lower values, is necessary in vertical flight at low altitudes, as it prevents in case of engine failure, the automatic adjustment of the pitch to the value of autogyration, with the very dangerous consequence of instantaneous losses in thrust and altitude.

The control of the pusher 34 allows also, in motorless vertical landing, to obtain a pull-up of the craft through a speedy increasing of the pitch, so as to obtain a landing of the craft without any shock. When landing in autogyration oblique path, such control does not hinder the operation of the flywheel and may, therefore, be used again for cooperating in achieving an increase in pitch, already provided as disclosed through the acceleration of the blades due to the eventual nose-lift.

Obviously, the length of the pusher must be chosen so that, in retracted position (lever 30 against stop 31), it does not hinder the action of the centrifugal governor.

Similarly, the R. P. M. control hand lever 26, the pitch control lever 30 is set, during flight, between the position illustrated in Fig. 4 (abutment against 31) and the right-hand end position. However, as before, for very special purposes, the lever 30 is adapted to be moved, by a willing action of the pilot, past the stop 31 to the end position 38. This maneuver is effected, on the ground, for taxying or for testing the engine before starting. In both cases, it is desired to achieve a relatively high R. P. M. with a very low or even zero pitch, in order to avoid any lifting of the craft.

Indeed, when the lever 30 is at 38, the upper pusher member 39 which is slidably arranged through the piston abutment 29, is depressed; it forces the slide-valve 17 down into exhaust position, and keeps it in this position as long as the lever 30 remains opposite the end portion 38.

Figs. 5 and 6 show the arrangement of the various elements of the regulator device in a practical embodiment. The whole device is enclosed inside a properly shaped housing 60 at the top of which are secured a cylindrical member 62 and a generally circular cover flange 61, and at the bottom of which is fitted up the hydraulic control system including the pump 12, the supply duct 20, the by-pass duct 21, the relief-valve 13, the main slide-valve 17 and the auxiliary one 25 with its return spring 9. The primary shaft 11 is fitted up inside the member 62, across its bottom, and through the housing 60 to the pump 12. The cover flange 61 bears the assembly including the governor speeder spring 18 and its movable piston abutment 29. It also supports, through roller bearings the fly-wheel 23.

The rotary casing 1 is also mounted on roller bearings 65—65 carried by the housing 60. The wall of this casing contains three longitudinal bores inside each of which are arranged two roller bearings 64—64 carrying an axle 63 fast with a planet-gear 2. The governor comprises three flyballs 14 which act on a rotary ring 66 mounted on roller bearings and linked to the slide-valve 17 through a short rod 54 ending with ball-and-socket joints.

In order to avoid undue friction, the pinion 6 has been replaced by a protruding snug 55 engaging a fork-shaped member 56 integral with the drum 4. The displacement of this snug is limited by means of two stops 10a and 10b, in two end positions corresponding to the two extreme positions of the auxiliary slide-valve 25 to which the snug 55 is connected through the shaft 8, the pinion 7 and the rack 5.

As illustrated, the whole regulator arrangement thus forms a compact unit which can be easily fitted up by merely engaging the pusher members 34 and 39 through corresponding bores at the top and at the bottom of the unit, by connecting up the hydraulic ram to the threaded passage indicated at 19 and the oil tank to a corresponding passage.

Fig. 7 shows diagrammatically a helicopter provided with the arrangement of the invention. In this diagram, the relative positions of the various members is shown, these members bearing the same reference numbers as above. In particular, the hand lever 26 is seen with its links to the cam 27 and to the throttle rod 51, as well as the rotary shaft 11 with its connection to the power absorbing blades 22.

It is to be understood that the form of the invention herewith shown and described is to be taken as a preferred example of the same and that various changes in the shape, size and arrangement of parts may be resorted to without departing from the spirit of the invention or the scope of the subjoined claims.

What we claim is:

1. A power plant control means for adjusting a rotary power absorbing apparatus, including a hydraulically-operated servo-motor and a source of pressure liquid provided with a discharge end connected to said servo-motor through duct means, comprising in combination valve means in said duct means for controlling the passage of pressure liquid to said servo-motor, a centrifugal speed governor rotatingly driven from said apparatus, linking means between said governor and said valve means for bringing the

9 latter under control of said governor, planet gears mounted on said governor for free rotation about axles fast with said governor, a sun gear meshing with said planet gears, a fly-wheel fast with said sun gear, a ring gear meshing with said planet gears and coaxial with the sun gear, and transmission means between the ring gear and the said valve means for bringing said valve means under control of said ring gear, whereby said valve means is under conjugate control of said governor and said fly-wheel.

2. A power plant control means for adjusting a rotary power absorbing apparatus, including a hydraulically-operated servo-motor and a source of pressure liquid provided with a discharge end connected to said servo-motor through duct means, comprising in combination valve means in said duct means for controlling the passage of pressure liquid to said servo-motor, said valve means including a piston-shaped member slidable in a cylindrical enclosure, a centrifugal speed governor rotatingly driven from said apparatus, linking means between said governor and said valve means for bringing the latter under control of said governor, further duct means between the discharge end of said source and said cylindrical enclosure, an exhaust passage from said cylindrical enclosure, further valve means for controlling the passage of pressure liquid to and from said cylindrical enclosure through said further duct means and said exhaust passage, planet gears mounted on said governor for free rotation about axles fast with said governor, a sun gear meshing with said planet gears, a fly-wheel fast with said sun gear, a ring gear meshing with said planet gears and coaxial with the sun gear, and transmission means between the ring gear and the said further valve means for bringing said further valve means under control of said ring gear, whereby said first-mentioned valve means is under conjugate control of said governor and said fly-wheel.

3. A power plant control means for adjusting a rotary power absorbing apparatus, including a hydraulically-operated servo-motor and a source of pressure liquid provided with a discharge end connected to said servo-motor through duct means, comprising in combination valve means in said duct means for controlling the passage of pressure liquid to said servo-motor, a centrifugal speed governor rotatingly driven from said apparatus, linking means between said governor and said valve means for bringing the latter under control of said governor, planet gears mounted on said governor for free rotation about axles fast with said governor, a sun gear meshing with said planet gears, a fly-wheel fast with said sun gear, a ring gear meshing with said planet gears and coaxial with the sun gear, means for preventing rotation of said ring gear beyond a predetermined angular position, and transmission means between the ring gear and the said valve means for bringing said valve means under control of said ring gear, whereby said valve means is under conjugate control of said governor and said fly-wheel.

4. Power plant control means according to claim 1, including a helicopter rotor having variable pitch blades, and means operatively connecting said servo-motor with said blades.

5. Power plant control means according to claim 4, said centrifugal governor comprising a rotary member driven from said helicopter rotor, governor flyballs supported on said rotary member, said linking means acting between said governor flyballs and said valve means, a governor speeder spring connected to act on said linking means in opposition to said flyballs, means for adjusting the pressure of said speeder spring and including a cam operatively engaging one end of said spring, and hand-actuated means operatively connected for controlling the position of said cam.

6. In a helicopter including an engine, hand-actuated means for adjusting the output of said engine, rotary helicopter blades drivingly connected to said engine, and means for adjusting the pitch of said blades including a hydraulically-operated servo-motor and a source of pressure liquid provided with a discharge end connected to said servo-motor through duct means, the combination of valve means in said duct means for controlling the passage of pressure liquid to said servo-motor, a centrifugal speed governor rotatingly driven from said apparatus, said governor including a rotary member and flyballs supported on said rotary member, linking means between said flyballs and said valve means for bringing the latter under control of said governor, a governor speeder spring one end of which acts on said linking means oppositely to the action of said flyballs, a movable piston abutment for the other end of said speeder spring, a shaped cam operatively engaging said piston abutment and operatively connected to said hand-actuated means for bringing said speeder spring under control of said hand-actuated means, planet gears mounted on said governor for free rotation about axles fast with said governor, a sun gear meshing with said planet gears, a fly-wheel fast with said sun gear, a ring gear meshing with said planet gears and coaxial with the sun gear, and transmission means between the ring gear and the said valve means for bringing said valve means under control of said ring gear, whereby said valve means is under conjugate control of said governor and said fly-wheel.

7. The combination defined in claim 6, said valve means including a piston-shaped member sliding in a cylindrical enclosure, further duct means between the discharge end of said source and said cylindrical enclosure, an exhaust passage from said cylindrical enclosure, further valve means for controlling the passage of pressure liquid to and from said cylindrical enclosure through said further duct means and said exhaust passage, said ring gear acting on said further valve means, whereby said first-mentioned valve means is under conjugate control of said governor and said fly-wheel.

8. A device according to claim 2, including a movable pusher element slidably fitted through an end of said cylindrical enclosure and engageable with said piston-shaped member to limit displacement thereof in one direction, and hand-actuated means for adjusting the position of said pusher elements.

9. A device according to claim 8, including means operatively connecting said servo-motor and said pusher element.

10. A device according to claim 9, including a second pusher element acting on said linking means and serving to limit displacement of said piston-shaped member in the opposite direction, and means operatively connecting said hand-actuated means to both said pusher elements.

11. In a helicopter provided with adjustable-pitch rotary blades, the pitch-adjusting means including a hydraulically operated servo-motor and a source of pressure liquid, said helicopter having an engine for driving said blades, and hand-actuated means for controlling the output of said engine, the combination of duct means between the discharge end of said source and said servo-motor; valve means on said duct means, for controlling the passage of pressure fluid to said servo-motor, said valve means including a piston-shaped member adapted to slide inside a cylindrical enclosure; a rotary member positively driven from said blades; governor flyballs supported by said rotary member; linking means between said governor flyballs and said valve means for adjusting the position thereof; further duct means between the discharge end of said source and said cylindrical enclosure; an exhaust passage from said cylindrical enclosure; further valve means for controlling the passage of pressure liquid to and from said cylindrical enclosure through said further duct means and said exhaust passage; a governor speeder spring acting, through one end thereof, on said linking means oppositely to the action of said flyballs, a movable piston abutment for the other end of said speeder spring for adjusting the stress thereof, a shaped cam associated with said piston abutment for adjusting the position thereof; a linkage between said cam and said hand-actuated means, for bringing said cam under control of said hand-actuated means; a movable pusher slidably fitted through an end of said cylindrical enclosure and engageable with said piston-shaped member to limit displacement thereof in the corresponding direction; an articulated linkage between said pusher and said servo-motor for adjusting the position of said pusher according to the pitch of the blades; a further movable pusher slidably fitted through said piston abutment and adapted to cooperate with said linking means, for limiting displacement of said valve means in the opposite direction; a hand lever connected to both of said pushers and adapted to adjust simultaneously the positions thereof; at least one planet-gear mounted on said rotary member for free rotation relatively thereto; a sun gear meshing with said planet gear; a flywheel fast with said sun gear; a ring gear meshing with said planet gear; abutting means for preventing rotation of said ring gear beyond a predetermined angular position; and transmission means between said ring gear and said valve means for adjusting the position thereof.

LOUIS BREGUET.
RENÉ DEVILLERS.

REFERENCES CITED

The following references are of record in the file of this patent:

UNITED STATES PATENTS

| Number | Name | Date |
| --- | --- | --- |
| 742,842 | Dodge | Nov. 3, 1903 |
| 1,130,659 | Baldwin | Mar. 2, 1915 |
| 2,358,894 | Volet | Sept. 26, 1944 |
| 2,391,323 | Martin | Dec. 18, 1945 |
| 2,421,873 | Forsyth | June 10, 1947 |
| 2,422,966 | Hoover | June 24, 1947 |
| 2,455,378 | McCoy | Dec. 7, 1948 |